United States Patent
Sato et al.

(10) Patent No.: US 7,500,936 B2
(45) Date of Patent: Mar. 10, 2009

(54) FAIL DETECTING APPARATUS FOR AUTOMATIC TRANSMISSION

(75) Inventors: Tetsuya Sato, Fuji (JP); Takateru Kawaguchi, Fuji (JP)

(73) Assignee: Jatco Ltd (JP)

( * ) Notice: Subject to any disclaimer, the term of this patent is extended or adjusted under 35 U.S.C. 154(b) by 375 days.

(21) Appl. No.: 11/466,101

(22) Filed: Aug. 21, 2006

(65) Prior Publication Data

US 2007/0049457 A1    Mar. 1, 2007

(30) Foreign Application Priority Data

Aug. 26, 2005    (JP) ............................. 2005-245484

(51) Int. Cl.
*F16H 59/60*    (2006.01)
*F16H 59/62*    (2006.01)
(52) U.S. Cl. ..................................... 477/97; 477/906
(58) Field of Classification Search ................ 477/97, 477/906; 701/62
See application file for complete search history.

(56) References Cited

U.S. PATENT DOCUMENTS 5,072,703 A * 12/1991 Sutton .................. 123/179.4
6,907,970 B2 * 6/2005 Sugimura ................ 188/382
6,966,862 B2 * 11/2005 Inuta ...................... 475/119

FOREIGN PATENT DOCUMENTS

WO    WO 03-029700 A1    4/2003

* cited by examiner

*Primary Examiner*—Tisha D Lewis
(74) *Attorney, Agent, or Firm*—Rossi, Kimms & McDowell LLP

(57) ABSTRACT

A fail detecting apparatus for an automatic transmission which is capable of quickly detecting a failure of an oil pressure switch with accuracy. In addition to an oil pressure switch state determining process carried out while a vehicle is running, the state of an oil pressure switch is detected at the time of turning-on of an ignition switch before an engine is started, and if the oil pressure switch has continued to be ON until a timer value becomes equal to or greater than a predetermined value, it is determined that the oil pressure switch has failed. Since the state of the oil pressure switch is determined before the engine is started, i.e. in the state in which no oil pressure has been generated, whether the oil pressure switch is normal or has failed can be determined with high accuracy irrespective of which range is currently selected in the automatic transmission.

9 Claims, 8 Drawing Sheets

Fig. 2

|   | LOW/C | 2-6/B | 3-5R/C | H/C | L&R/B | LOW/OWC |
|---|---|---|---|---|---|---|
| P |  |  |  |  |  |  |
| R |  |  | ◯ |  | ◯ |  |
| N |  |  |  |  |  |  |
| D 1st | ◯ |  |  |  | ⊗ | ● |
| D 2nd | ◯ | ◯ |  |  |  |  |
| D 3rd | ◯ |  | ◯ |  |  |  |
| D 4th | ◯ |  |  | ◯ |  |  |
| D 5th |  |  | ◯ | ◯ |  |  |
| D 6th |  | ◯ |  | ◯ |  |  |

FAIL DETECTING APPARATUS FOR AUTOMATIC TRANSMISSION

BACKGROUND OF THE INVENTION

1. Field of the Invention

The present invention relates to a fail detecting apparatus for a vehicular automatic transmission, and more particularly to a fail detecting apparatus which detects failure of oil pressure switches which detect operating oil pressure of friction elements.

2. Description of the Prior Art

Vehicular automatic transmissions are equipped with a plurality of friction elements to realize a plurality of gear positions by engagement and disengagement of the friction elements in combination. Oil pressure switches which detect operating pressure of the respective friction elements are provided in a hydraulic circuit and used for feedback-control of operating pressure.

On the other hand, when a predetermined friction element set in advance is engaged and another friction element is additionally engaged, their simultaneous engagement causes interlock. Thus, in the case where a combination of friction elements to which supply of oil pressure has been detected by oil pressure switches causes interlock, the shift stage is fixed at a gear position designated in advance so as to avoid interlock.

However, if an electric system such as oil pressure switches has failed, it is difficult to properly control operating pressure, and in particular, interlock is erroneously detected, making it necessary to carry out control which is unnecessary under normal conditions. To avoid this, it is necessary to check whether or not oil pressure switches are normal.

To this end, the applicant of the present application has proposed in Kohyo No. WO2003/029700 an automatic transmission control apparatus which determines that an electric failure has occurred if, in a state in which the gear position is being kept at any gear position, a friction element engaged at this gear position and a friction element to which supply of oil pressure has been detected by an oil pressure switch do not coincide.

With this arrangement, even when an electric failure occurs, no measures to avoid interlock are taken, so that normal control can be continued.

However, the above conventional automatic transmission control apparatus has the problem that, although it is possible to detect the occurrence of an electric failure, it is difficult to determine whether an oil pressure switch has failed or a hydraulic control valve using a solenoid or the like in a hydraulic circuit has malfunctioned, because there are various conditions on which a friction element engaged at the present gear position and a friction elements of which engagement has been detected by an oil pressure switch do not coincide.

SUMMARY OF THE INVENTION

It is therefore an object of the present invention to provide a fail detecting apparatus for an automatic transmission which, in the event of a failure of an oil pressure switch, detects the failure as correctly as possible so as to quickly cope with the failure.

To attain the above object, there is provided a fail detecting apparatus for a vehicular automatic transmission comprising an oil pressure switch ON detecting means for detecting whether any of oil pressure switches is on, and a fail determining means for determining the state of the oil pressure switch based on the result of detection by said oil pressure switch ON detecting means, wherein at the time of turning-on of an ignition switch before an engine is started, said fail determining means determines that the oil pressure switch has failed when the oil pressure switch is on.

According to the present invention, the state of the oil pressure switch is detected before the engine is started, i.e. in the state in which no oil pressure has been generated, and hence even if an electric hydraulic actuator or the like malfunctions due to interference, this does not affect the determination at all.

Thus, irrespective of which range is currently designated in the automatic transmission, whether the oil pressure switch is normal or has failed can be determined with high accuracy, and the state of the oil pressure switch can be detected at an early stage before the engine is started.

As a result, if the oil pressure switch is normal, measures to avoid interlock can be quickly taken in the case where a friction element engaged at a designated gear position and a friction element of which engaged state has been detected by the oil pressure switch does not coincide, and if the oil pressure switch has failed, unnecessary measures to avoid interlock can be dispensed with.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a diagram showing combinations of engaged/disengaged friction elements;

DETAILED DESCRIPTION OF THE PREFERRED EMBODIMENTS

The present invention will now be described in detail with reference to the drawings showing a preferred embodiment thereof.

Figure 1:
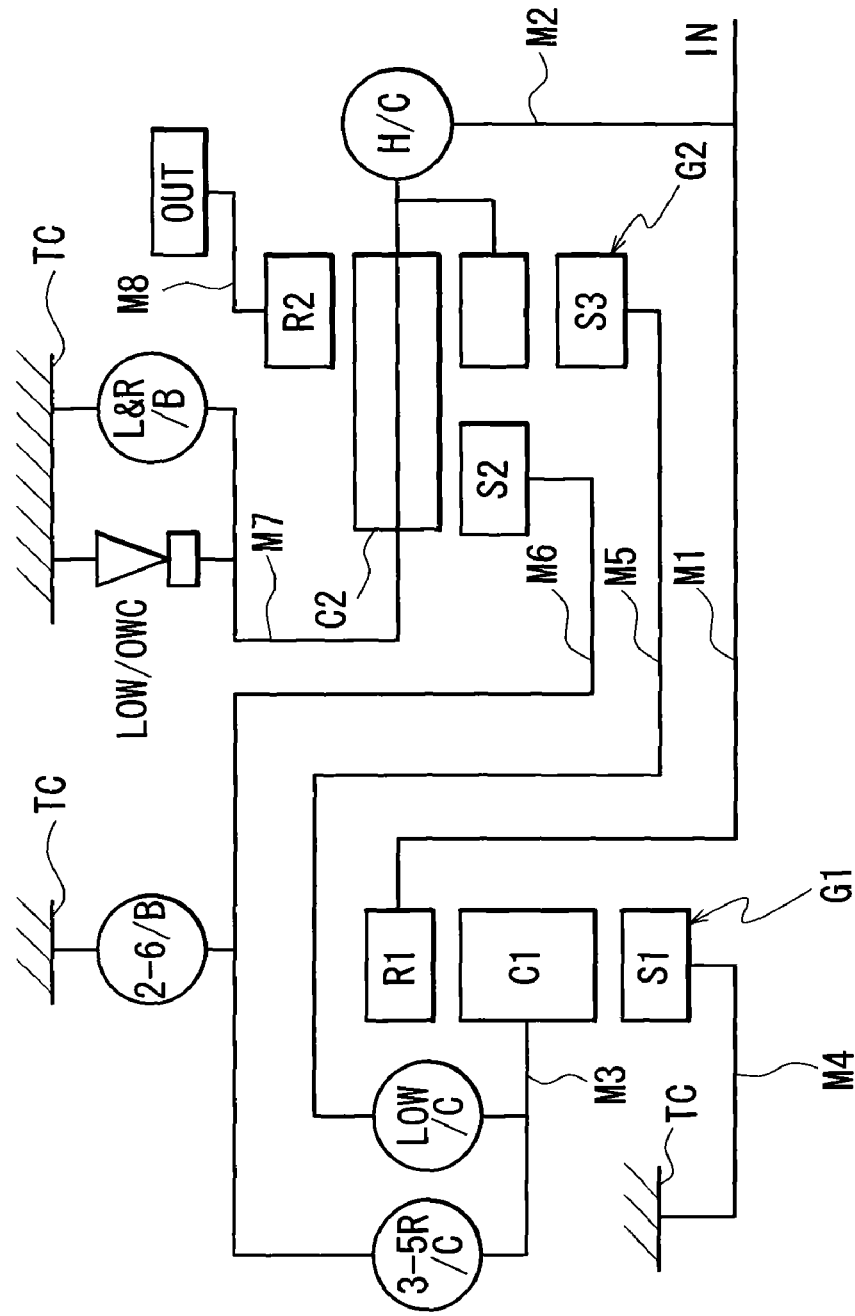
FIG. 1 is a skeleton diagram showing gear trains of an automatic transmission to which an embodiment of the present invention is applied.

FIG. 1 is a skeleton diagram showing gear trains of an automatic transmission to which an embodiment of the present invention is applied.

This automatic transmission is comprised of a simple planetary-gear set G1 and a Ravigneaus type planetary-gear set G2. The planetary-gear set G1 is comprised of a first sun gear S1, a first carrier C1, and a first ring gear R1. The planetary-gear set G2 is comprised of a second sun gear S2, a second carrier C2, a third sun gear S3, and a second ring gear R2.

An input shaft IN to which driving force is input via an engine and a torque converter, both of which are not shown, is connected directly to the first ring gear R1 via a first member M1. The input shaft IN is also connected to the second carrier C2 via a second member M2 and a high clutch H/C.

The first carrier C1 is connected to the third sun gear S3 via a third member M3, a low clutch LOW/C, and a fifth member M5. The first carrier C1 is also connected to the second sun gear S2 via the third member M3, a 3-5 reverse clutch 3-5R/C, and a sixth member M6. The sixth member M6 can be fixed to or released from a transmission case TC via a 2-6 brake 2-6/B.

The first sun gear S1 is fixed to the transmission case TC via a fourth member M4. The second carrier C2 is supported on the transmission case TC via a seventh member M7, and a low-and-reverse brake L&R/B and a low one-way clutch LOW/OWC, which are arranged in parallel with each other, such that the second carrier C2 may rotate in one direction and may be inhibited from being rotated (fixed) and allowed to be rotated from the rotation-inhibited state.

The second ring gear R2 is connected to an output gear OUT via an eighth member M8.

The automatic transmission constructed as described above realizes six forward speed (1st to 6th) gear positions and one reverse speed (Rev) gear position by engaging and disengaging friction elements as shown in FIG. 2 in combination. In FIG. 2, the circular mark indicates that the concerned friction element is engaged, no mark indicates that the concerned friction element is disengaged, the circular mark with x indicates that the concerned friction element is engaged and operable at the time of engine braking. And the black-out circle indicates that the concerned friction element is mechanically engaged (inhibited from rotating) when the engine outputs a driving force.

In the D range, automatic gear shifting to the six forward speed gear positions is carried out according to a gear shift schedule set based on the vehicle speed and the throttle opening angle. Also, gear shifting to the one reverse speed gear position is carried out by switching a shift lever from the D range to the R range.

Referring next to FIGS. 1 and 2, a description will be given of rotation transmission paths for respective speed gear positions.

The first speed (1st) gear position is achieved by engagement of the low clutch LOW/C and engagement of the low-and-reverse brake L&R/B or the low one-way clutch LOW/OWC.

The engine rotation from the input shaft IN is decelerated through the first member M1 and the planetary-gear set G1, and the decelerated rotation is input to the third sun gear S3 from the third member M3 through the low clutch LOW/C and the fifth member M5. In the planetary-gear set G2, the second ring gear R2, being subjected to reactive force from the second carrier C2 fixed to the transmission case TC by engagement of the low one-way clutch LOW/OWC, rotates while decelerating, and the decelerated rotation at the maximum reduction ratio is output from the output gear OUT through the eighth member M8. It should be noted that at the time of engine braking, the low-and-reverse brake L&R/B is subjected to the reactive force in place of the idling low one-way clutch LOW/OWC.

The second speed (2nd) gear position is achieved by engagement of the low clutch LOW/C and engagement of the 2-6 brake 2-6/B.

The rotation from the input shaft IN is decelerated through the first member M1 and the planetary-gear set G1, and the decelerated rotation is input to the third sun gear S3 from the third member M3 through the low clutch LOW/C and the fifth member M5. In the planetary-gear set G2, the second ring gear R2, being subjected to reactive force from the second sun gear S2 fixed to the transmission case TC by engagement of the 2-6 brake 2-6/B, rotates while decelerating, and the decelerated rotation at a smaller reduction ratio as compared with the first speed gear position is output from the output gear OUT through the eighth member M8.

The third speed (3rd) gear position is achieved by engagement of the low clutch LOW/C and engagement of the 3-5 reverse clutch 3-5R/C.

The rotation from the input shaft IN is decelerated through the first member M1 and the planetary-gear set G1, and the decelerated rotation is input to the third sun gear S3 from the third member M3 through the low clutch LOW/C and the fifth member M5. The rotation from the third member M3 is input to the second sun gear S2 as well through the 3-5 reverse clutch 3-5R/C and the sixth member M6.

As a result, the Ravigneaux type planetary-gear set G2 is brought into a directly-connected state, and hence the second ring gear R2 rotates at the same speed as the speed at which the sun gears S2 and S3 rotate, and the decelerated rotation at a smaller reduction ratio as compared with the second speed gear position is output from the output gear OUT through the eighth member M8.

The fourth speed (4th) gear position is achieved by engagement of the low clutch LOW/C and engagement of the high clutch H/C.

The rotation from the input shaft IN is decelerated through the first member M1 and the planetary-gear set G1, and the decelerated rotation is input to the third sun gear S3 from the third member M3 through the low clutch LOW/C and the fifth member M5.

Further, the same rotation as the rotation at the input shaft IN is input from the input shaft IN to the second carrier C2 through the second member M2 and the high clutch H/C.

In the planetary-gear set G2, the second ring gear R2 rotates at a speed intermediate between the two rotations input as above, and the rotation decelerated slightly as compared with the input rotation is output from the output gear OUT through the eighth member M8.

The fifth speed (5th) gear position is achieved by engagement of the 3-5 reverse clutch 3-5 R/C and engagement of the high clutch H/C.

The rotation from the input shaft IN is decelerated through the first member M1 and the planetary-gear set G1, and the decelerated rotation is input to the second sun gear S2 from the third member M3 through the 3-5 reverse clutch 3-5R/C and the sixth member M6.

Further, the same rotation as the rotation at the input shaft IN is input from the input shaft IN to the second carrier C2 through the second member M2 and the high clutch H/C.

In the planetary-gear set G2, the second ring gear R2 rotates while being restrained by the two rotations input as above, and the rotation accelerated slightly as compared with the input rotation is output from the output gear OUT through the eighth member M8.

The sixth speed (6th) gear position is achieved by engagement of the high clutch H/C and engagement of the 2-6 brake 2-6/B.

The same rotation as the rotation at the input shaft IN is input from the input shaft IN to only the second carrier C2 through the second member M2 and the high clutch H/C.

In the planetary-gear set G2, the second ring gear R2, being subjected to reactive force from the second sun gear S2 fixed to the transmission case TC by engagement of the 2-6 brake 2-6/B, rotates while accelerating, and the rotation accelerated as compared with the fifth speed gear position is output from the output gear OUT through the eighth member M8.

The reverse speed (Rev) gear position is achieved by engagement of the 3-5 reverse clutch 3-5 R/C and engagement of the low-and-reverse brake L&R/B.

The rotation from the input shaft IN is decelerated through the first member M1 and the planetary-gear set G1, and the decelerated rotation is input to the second sun gear S2 from the third member M3 through the 3-5 reverse clutch 3-5R/C and the sixth member M6.

The second ring gear R2, being subjected to reactive force from the second carrier C2 fixed to the transmission case TC by engagement of the low-and-reverse brake L&R/B, rotates in the reverse direction, and the decelerated reverse rotation is output from the output gear OUT through the eighth member M8.

Figure 3:
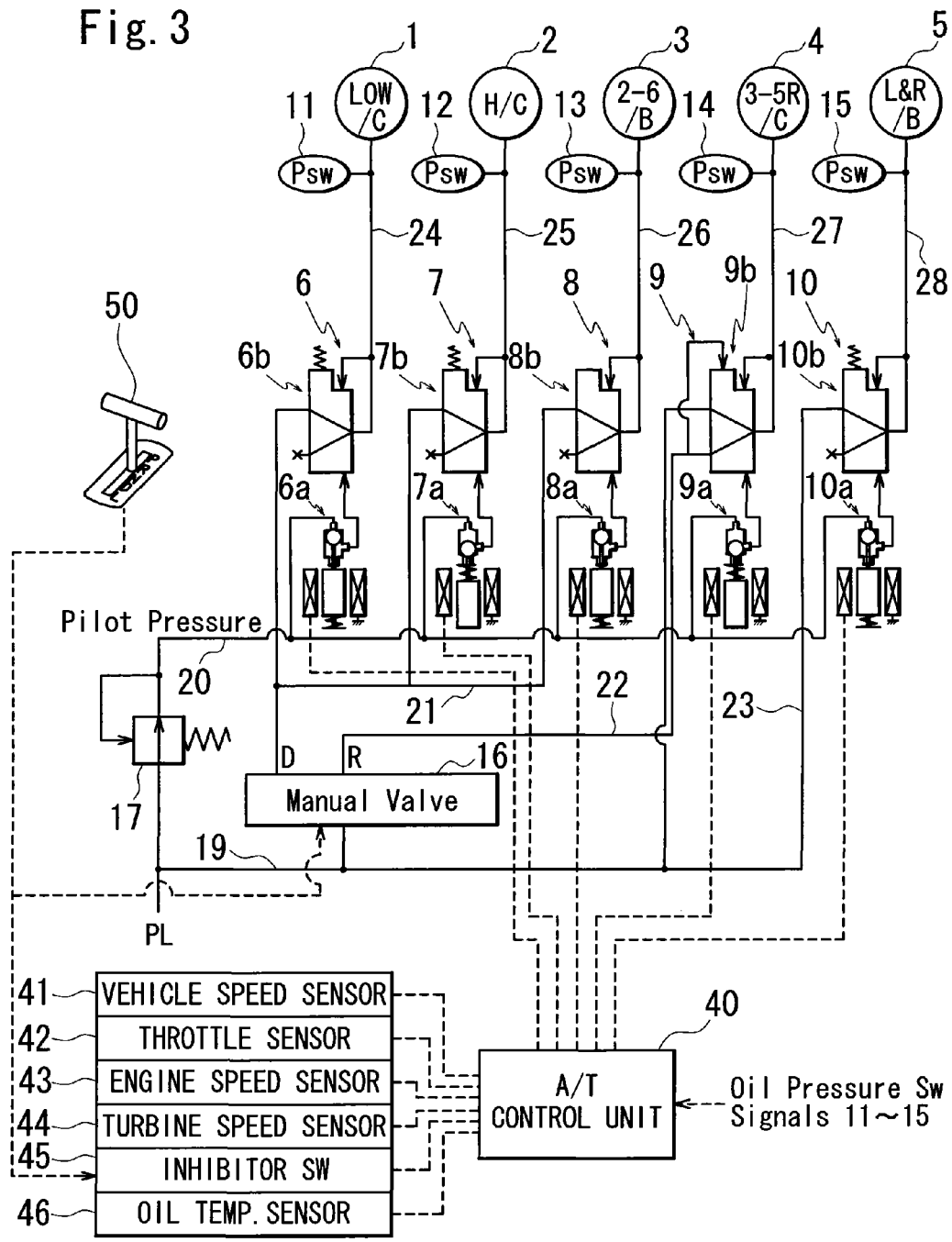
FIG. 3 is a diagram showing a hydraulic circuit and an electronic gearshift control system.

FIG. 3 is a diagram showing a hydraulic circuit and an electronic shift control system for carrying out the shift control described above.

The low-clutch LOW/C, the high clutch H/C, the 2-6 brake 2-6/B, the 3-5 reverse clutch 3-5R/C, and the low-and-reverse brake L&R/B are engaged by supplying engagement pressure which is D range pressure or R range pressure to engagement piston chambers 1 to 5 and disengaged by releasing the engagement pressure.

It should be noted that D range pressure is line pressure through a manual valve, described later, and is generated only when the D range is selected. The R range pressure is line pressure through the manual valve and is generated only when the R range is selected; when any other range is selected, no pressure is generated because of switching to a drain port, not shown.

The engagement pressure (low clutch pressure) to the engagement piston chamber 1 of the low clutch LOW/C is controlled by a first hydraulic control valve 6.

The engagement pressure (high clutch pressure) to the engagement piston chamber 2 of the high clutch H/C is controlled by a second hydraulic control valve 7.

The engagement pressure (2-6 brake pressure) to the engagement piston chamber 3 of the 2-6 brake 2-6/B is controlled by a third hydraulic control valve 8.

The engagement pressure (3-5 reverse clutch pressure) to the engagement piston chamber 4 of the 3-5 reverse clutch 3-5R/C is controlled by a fourth hydraulic control valve 9.

The engagement pressure (low-and-reverse brake pressure) to the engagement piston chamber 5 of the low-and-reverse brake L&R/B is controlled by a fifth hydraulic control valve 10.

The D range pressure from a manual valve 16 is supplied to the first to third hydraulic control valves 6 to 8 through a D range pressure oil passage 21. The line pressure PL is supplied to the manual valve 16 through a line pressure oil passage 19.

The line pressure PL is directly supplied to the fourth hydraulic control valve 9, and the R range pressure from the manual valve 16 is supplied to the fourth hydraulic control valve 9 through an R range pressure oil passage 22.

The line pressure PL is directly supplied to the fifth hydraulic control valve 10.

Pilot pressure obtained by regulating the line pressure PL with a pilot valve 17 is supplied to the hydraulic control valves 6 to 10 through a pilot pressure oil passage 20.

The first hydraulic control valve 6 is comprised of a first duty solenoid 6*a* that produces shift control pressure using pilot pressure as the original pressure and by solenoid force, and a first regulating valve 6*b* that regulates low clutch pressure using D range pressure as the original pressure and using shift control pressure and feedback pressure as actuating signal pressure.

The first duty solenoid 6*a* is controlled according to a duty ratio. Specifically, the first duty solenoid 6*a* controls the low clutch pressure to zero in the solenoid OFF state and increases the low clutch pressure in the solenoid ON state as the ON duty ratio increases.

The second hydraulic control valve 7 is comprised of a second duty solenoid 7*a* that produces shift control pressure using pilot pressure as the original pressure and by solenoid force, and a second regulating valve 7*b* that regulates high clutch pressure using D range pressure as the original pressure and using shift control pressure and feedback pressure as actuating signal pressure.

The second duty solenoid 7*a* controls the high clutch pressure to zero in the solenoid ON state (an ON duty ratio of 100%), increases the high clutch pressure as the ON duty ratio decreases, and controls the high clutch pressure to the maximum in the solenoid OFF state.

The third hydraulic control valve 8 is comprised of a third duty solenoid 8*a* that produces shift control pressure using pilot pressure as the original pressure and by solenoid force, and a second regulating valve 8*b* that regulates 2-6 brake pressure using D range pressure as the original pressure and using shift control pressure and feedback pressure as actuating signal pressure.

The third duty solenoid 8*a* controls the 2-6 brake pressure to zero in the solenoid OFF state and increases the 2-6 brake pressure in the solenoid ON state as the ON duty ratio increases.

The fourth hydraulic control valve 9 is comprised of a fourth duty solenoid 9*a* that produces shift control pressure using pilot pressure as the original pressure and by solenoid force, and a fourth regulating valve 9*b* that regulates 3-5 reverse clutch pressure using line pressure as the original pressure and using shift control pressure and feedback pressure as actuating signal pressure when the D range is selected, and supplies line pressure as R range pressure directly to the 3-5 reverse clutch 3-5 R/C using R range pressure as actuating signal pressure when the R range is selected.

The fourth duty solenoid 9*a* controls the 3-5 reverse clutch pressure to zero in the solenoid ON state (an ON duty ratio of 100%), increases the 3-5 reverse clutch pressure as the ON duty ratio decreases, and controls the 3-5 reverse clutch pressure to the maximum in the solenoid OFF state.

The fifth hydraulic control valve 10 is comprised of a fifth duty solenoid 10*a* that produces shift control pressure using pilot pressure as the original pressure and by solenoid force, and a fifth regulating valve 10*b* that regulates low-and-reverse brake pressure using line pressure as the original pressure and using shift control pressure and feedback pressure as actuating signal pressure.

The fifth duty solenoid 10*a* controls the low-and-reverse brake pressure to zero in the solenoid OFF state and increases the low-and-reverse brake pressure in the solenoid ON state as the ON duty ratio increases.

In the hydraulic circuit, first to fifth oil pressure switches (PSW) 11 to 15 are provided as oil pressure switches that detect operating pressures of the respective friction elements.

Specifically, the first oil pressure switch 11 is provided in a low clutch pressure oil passage 24 connecting the first hydraulic control valve 6 and the engagement piston chamber 1.

The second oil pressure switch 12 is provided in a high clutch pressure oil passage 25 connecting the second hydraulic control valve 7 and the engagement piston chamber 2.

The third oil pressure switch 13 is provided in a 2-6 brake pressure oil passage 26 connecting the third hydraulic control valve 8 and the engagement piston chamber 3.

The fourth oil pressure switch 14 is provided in a 3-5 reverse clutch pressure oil passage 27 connecting the fourth hydraulic control valve 9 and the engagement piston chamber 4.

The fifth oil pressure switch 15 is provided in a low-and-reverse brake pressure oil passage 28 connecting the fifth hydraulic control valve 10 and the engagement piston chamber 5.

Each of the first to fifth oil pressure switches 11 to 15 outputs an ON signal when engagement pressure is supplied and outputs an OFF signal when engagement pressure is not supplied.

It should be noted that the ON or OFF state of the first to fifth oil pressure switches 11 to 15 does not mean closure or opening of contacts themselves. That is, if the first to fifth oil pressure switches 11 to 15 are oil pressure switches of a normally closed contact type, the ON state thereof means a state in which they are in the open position due to supply of engagement pressure thereto.

In the P and N ranges, no clutches or brakes are engaged, and hence no operating pressure is supplied.

Also, line pressure is supplied as operating pressure particularly to the low clutch LOW/C, high clutch H/C, and 2-6 brake 2-6/B, which are engaged in the forward D range, through the manual valve 16. Thus, in the P, R, and N ranges other than the D range, no oil pressure acts on these clutches since the flow of oil pressure is interrupted by the manual valve 16.

The electronic shift control system is comprised of an A/T control unit 40 to which signals from a vehicle speed sensor 41, a throttle sensor 42, an engine speed sensor 43, a turbine rotational speed sensor 44, an inhibitor switch 45, and an oil temperature sensor 46 are input. Signals from the oil pressure switches 11 to 15 are also input to the A/T control unit 40. The inhibitor switch 45 is provided to a link connecting the shift lever 50 and the manual valve 16, for outputting a signal indicative of a range selected through operation of the shift lever 50.

The A/T control unit 40 performs computations based on the above input signals and under a shift control rule, a fail-safe control rule, and so forth set in advance and outputs solenoid driving signals as engaging commands or disengaging commands according to the computation results to the first to fifth duty solenoids 6a to 10a.

In parallel, the A/T control unit 40 additionally carries out an oil pressure switch state determining process.

In the case where friction elements that should be engaged at a currently selected gear position and friction elements of which engaged states have been detected by oil pressure switches do not coincide, the A/T control unit 40 takes measures to avoid interlock if the oil pressure switch is normal, and does not take measures to avoid interlock if the oil pressure switches are not normal.

A description will now be given of the oil pressure switch state determining process carried out by the A/T control unit 40.

The state of an oil pressure switch is determined in two stages. The first stage of determination is carried out when, at the start of driving, an ignition switch is turned on immediately before a starter motor for starting the engine is driven. The second stage of determination is carried out as a normal routine after the completion of the first stage.

Figure 4:
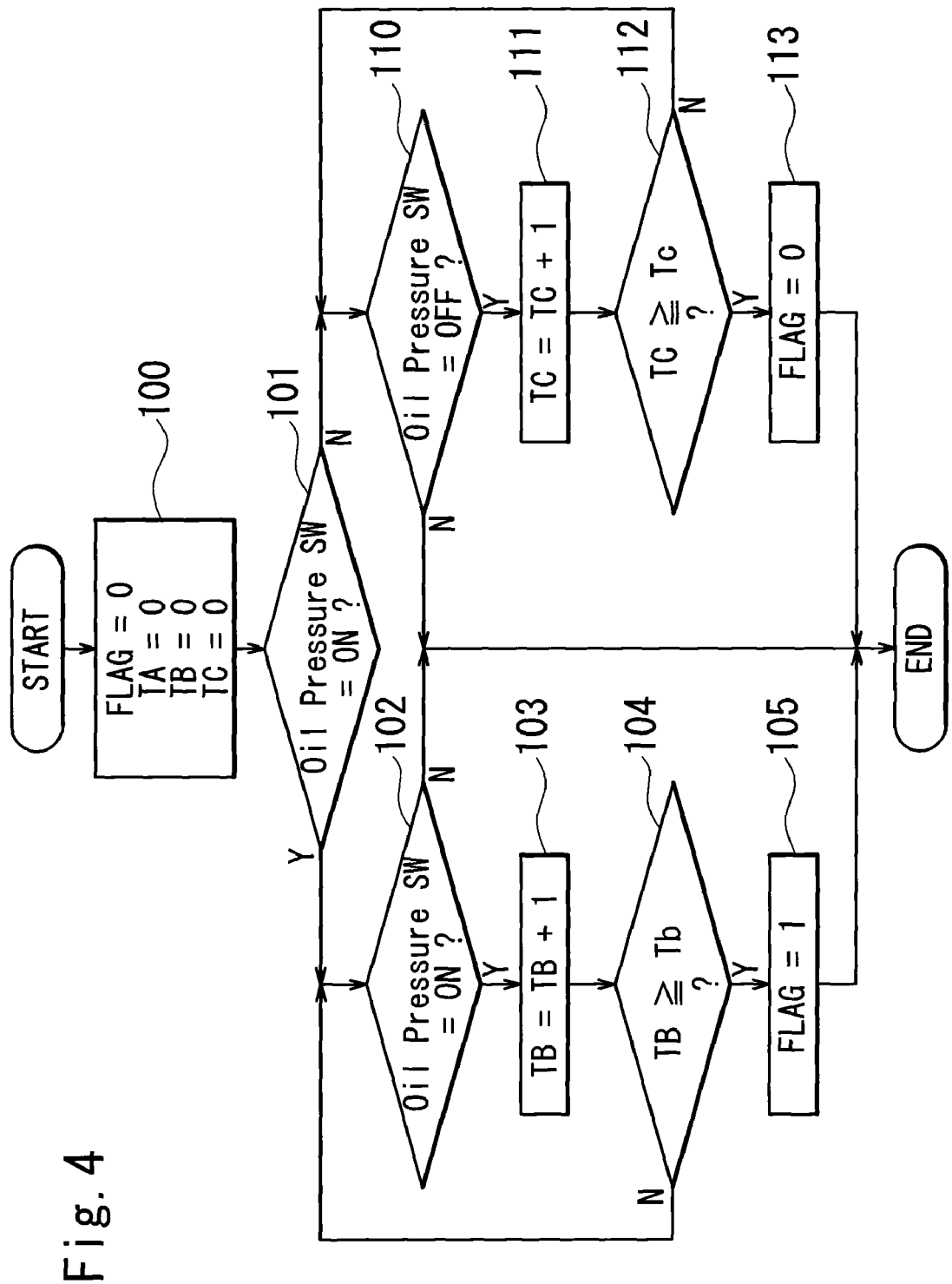
FIG. 4 is a flow chart showing an oil pressure switch state determining process in a first stage.

FIG. 4 is a flow chart showing the first stage of the oil pressure switch state determining process.

When the A/T control unit 40 is activated upon turning-on of the ignition switch, first, an initialization process in which an abnormal flag FLAG and timer values TA, TB, and TC are reset to zero is carried out in a step 100 (at a time t0 in FIG. 5 referred to later).

The timer value TA is indicative of the detection delay time in the second stage, described later, the timer value TB is indicative of the duration of time that an oil pressure switch is being abnormal, and the timer value TC is indicative of the duration of time that an oil pressure switch is being normal. These timer values are counted at intervals of control periods, for example, 10 msec.

In a step 101, it is determined whether or not any of the first to fifth oil pressure switches 11 to 15 (hereinafter merely referred to as "the oil pressure switch" except in the case where they are distinguished from one another) is ON.

The ON state of an oil pressure switch means that operating pressure for engaging a friction element, i.e. engagement pressure is supplied if the oil pressure switch is normal.

However, no operating pressure should be generated in the first stage since the engine has not yet been started, and hence if the oil pressure switch is ON in the first stage, it can be considered that the oil pressure switch has failed.

If the oil pressure switch is ON in the step 101, the process proceeds to a step 102.

In the step 102, whether or not the oil pressure switch is ON is determined again after the lapse of a short time, so that it is determined whether or not the oil pressure switch has been continued to be ON.

If it is determined in the step 102 that the oil pressure switch is ON, the process proceeds to a step 103 wherein counting of the timer value TB is started by incrementing it.

In the next step 104, it is determined whether or not the timer value TB has become equal to or greater than a predetermined value Tb set in advance. The steps 102 to 104 are repeated until the timer TB becomes equal to or greater than the predetermined value Tb.

At a time t3 when the oil pressure switch has continued to be ON until the timer value TB becomes equal to or greater than the predetermined value Tb, the process proceeds to a step 105 wherein the abnormal flag FLAG is set to "1" (FLAG=1), which completes the first stage.

As a result, it is indicated that the oil pressure switch has failed.

It should be noted that after becoming equal to or greater than the predetermined value Tb, the timer value TB keeps the value.

Figure 5:
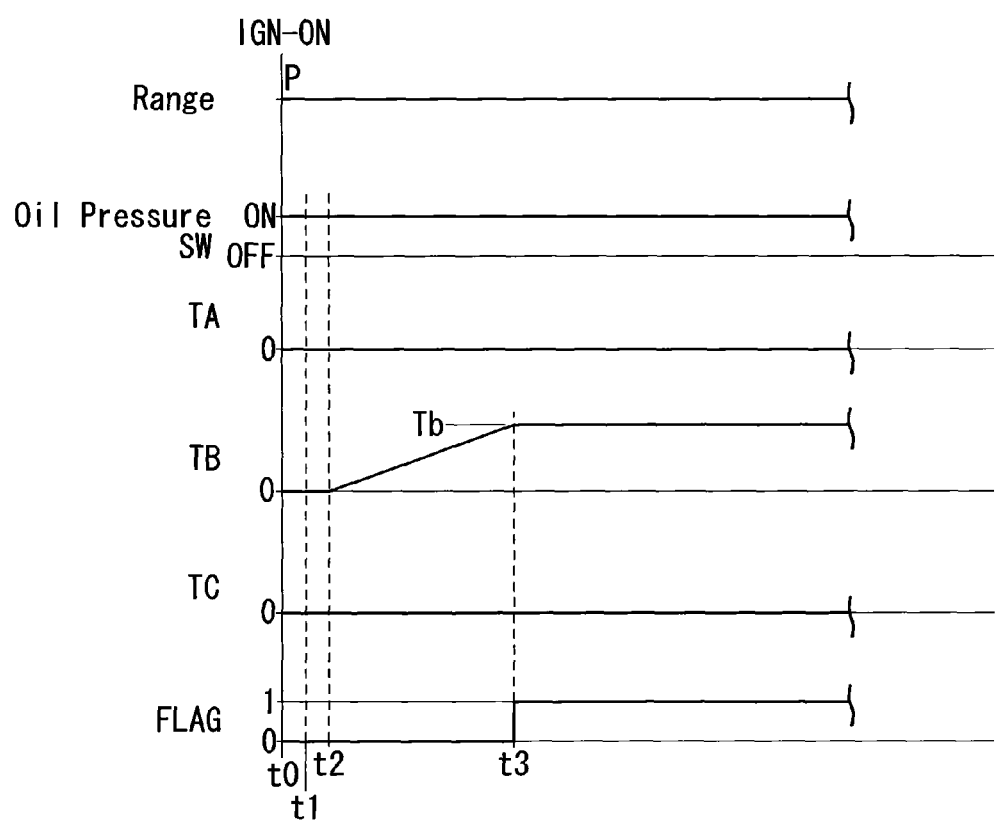
FIG. 5 is a time chart showing changes in control parameters in the case where it can be determined that an oil pressure switch has failed.

FIG. 5 is a time chart showing changes in control parameters in the corresponding steps 101 to 105 in the case where it can be determined that the oil pressure switch has failed.

After the ignition switch is turned on (IGN-ON), if it is determined at a time t1 that the oil pressure switch is ON, it is checked that the P (or N) range is currently selected, and if it is determined at a time t2 that the oil pressure switch has continued to be ON, counting of the timer value TB is started.

At the time t3 when the oil pressure switch has continued to be ON until the timer value Tb has become equal to or greater than the predetermined value Tb, the abnormal flag FLAG is set to "1" (FLAG=1) to indicate that the oil pressure switch has failed.

If, as a result of checking in the step 102, it is determined that the oil pressure switch is not ON, the process is terminated and proceeds to the second stage since the oil pressure switch is not operating in a stable manner and hence it is difficult to complete the determination within a short period of time before the starter motor is driven.

On the other hand, if, as a result of the first checking in the step 101, it is determined that the oil pressure switch is not ON, i.e. the oil pressure switch is OFF, the process proceeds to a step 110 wherein after the lapse of a short time, whether or not the oil pressure switch is OFF is checked again so as to check whether the oil pressure switch has continued to be OFF.

If the oil pressure switch is still OFF, the process proceeds to a step 111 wherein counting of the timer value TC is started by incrementing it.

In the next step 112, it is checked whether or not the timer value TC has become equal to or greater than a predetermined value Tc set in advance. The steps 110 to 112 are repeated until the timer TC becomes equal to or greater than the predetermined value Tc. At a time t4 when the oil pressure switch has continued to be OFF until the timer value TC becomes equal to or greater than the predetermined value Tc, the process proceeds to a step 113 wherein the abnormal flag FLAG is kept in the reset state (FLAG=0), and the first stage is completed. That is, the abnormal flag FLAG is kept at 0.

Figure 6:
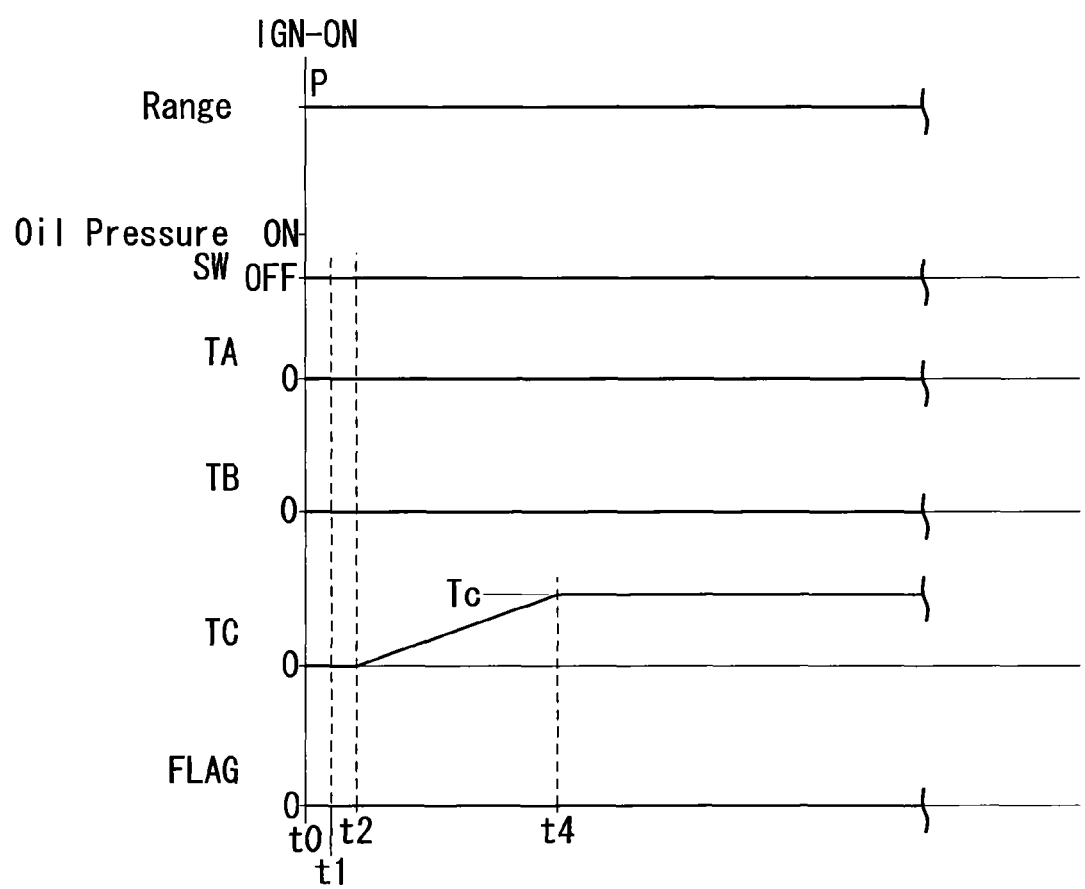
FIG. 6 is a time chart showing changes in control parameters in the case where it can be determined that an oil pressure switch is normal.

FIG. 6 is a time chart showing changes in control parameters in the corresponding steps 101 and 110 to 113 in the case where it can be determined that the oil pressure switch has not failed. The first checking of the oil pressure switch in the step 101 is carried out at the time t1, and the re-checking of the oil pressure switch in the step 110 is carried out at the time t2.

If the oil pressure switch is still OFF at the time t2, counting of the timer value TC is started.

At the time t4 when the oil pressure switch has continued to be OFF until the timer value TC has become equal to or greater than the predetermined value Tc, the abnormal flag is reset to 0 (FLAG=0) and thereafter is kept at 0 to indicate that the oil pressure switch is normal.

It should be noted that if as a result of checking in the step 110, it is determined that the oil pressure switch has been turned ON, the process is terminated and proceeds to the second stage since the oil pressure switch is not operating in a stable manner and hence the determination is difficult.

Figure 7:
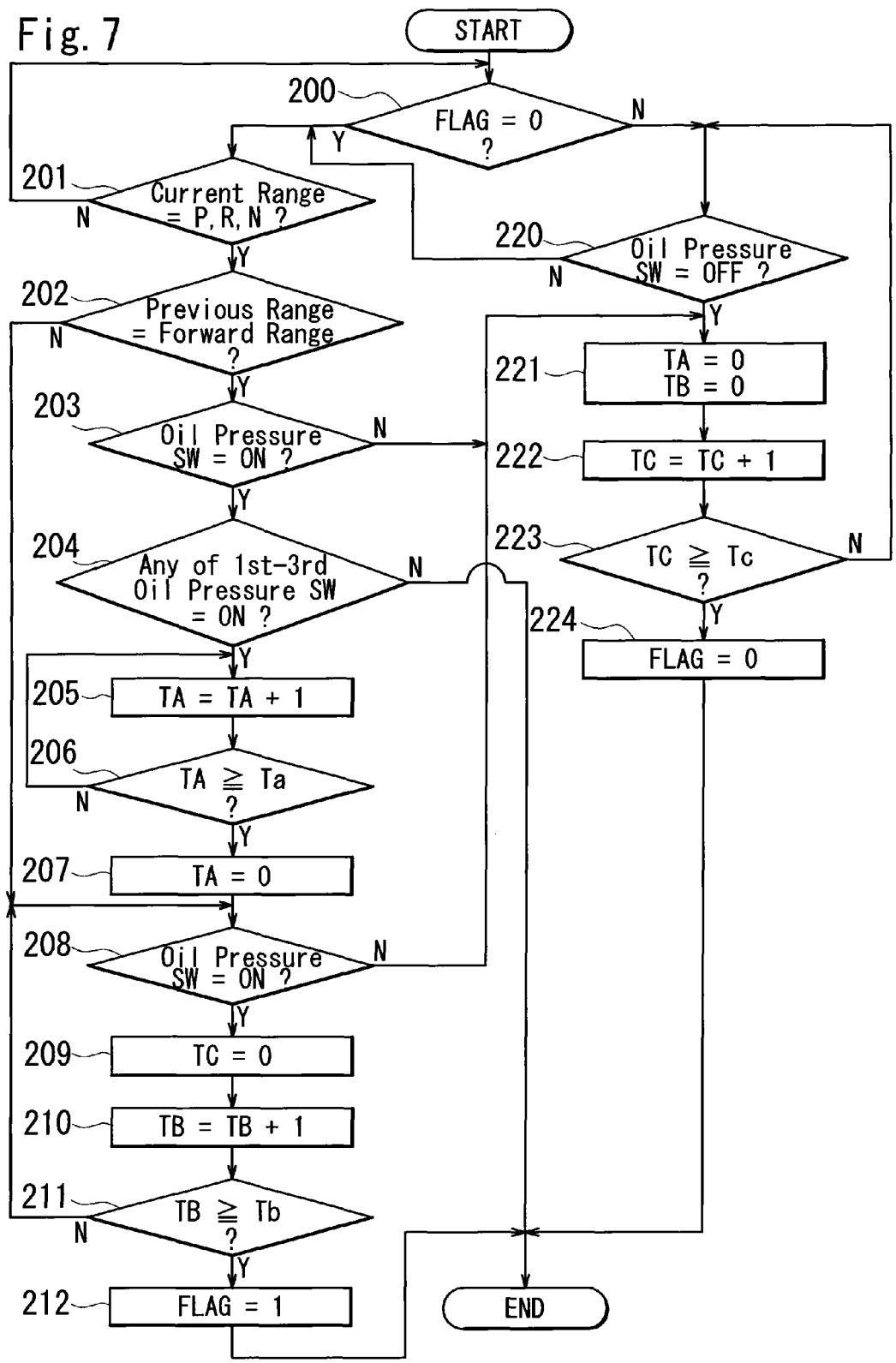
FIG. 7 is a flow chart showing an oil pressure switch state determining process in a second stage.

FIG. 7 is a flow chart showing the second stage of the oil pressure switch state determining process.

In a step 200, it is checked whether or not the abnormal flag assumes "0." If FLAG=0, the process proceeds to a step 201.

In the step 201, it is checked whether or not the P, R, or N range is currently selected. If the P, R, or N range is not currently selected, the process returns to the step 200.

If the P, R, or N range is currently selected, the process proceeds to a step 202 wherein it is determined whether or not the range selected in the previous flow is the forward D range.

If the range selected in the previous flow is the D range, for example, and the range has been just switched to the P, R, or N range, the process proceeds to a step 203.

In the step 203, it is checked whether or not the oil pressure switch is ON.

If the oil pressure switch is ON, the process proceeds to a step 204 wherein this turned-ON oil pressure switch is any of the first to third oil pressure switches 11 to 13 provided for friction elements which are engaged in only forward ranges.

If the turned-ON oil pressure switch is any of the first to third oil pressure switches 11 to 13, the process proceeds to a step 205.

On the other hand, if the turned-ON oil pressure switch is the fourth oil pressure switch 14 or the fifth oil pressure switch 15, the process is terminated. The reason is that line pressure can be supplied to the 3-5 reverse clutch 3-5R/C and the low-and-reverse brake L&R/B, which are friction elements with the respective fourth and fifth oil pressure switches 14 and 15, respectively, attached thereto, through the fourth hydraulic control valve 9 and the fifth hydraulic control valve 10, and therefore even if the fourth oil pressure switch 14 or the fifth oil pressure switch 15 is ON, it cannot be immediately determined that the fourth oil pressure switch 14 or the fifth oil pressure switch 15 has failed.

In the step 205, the timer value TA is incremented, and in the next step 206, it is checked whether or not the timer value TA has become equal to or greater than a predetermined value Ta set in advance. The steps 205 and 206 are repeated until the timer value TA becomes equal to or greater than the predetermined value Ta.

Thus, a detection delay time is provided as described above so as to avoid erroneous detection during falling of oil pressure supplied to a friction element engaged in the forward range. The value Ta is set based on the oil temperature.

When the timer value TA becomes equal to or greater than the predetermined value Ta, the process proceeds to a step 207 wherein the timer value TA is reset, and then the process proceeds to a step 208.

If as a result of checking in the step 202, the range selected in the previous flow is the P, R, or N range, the period of falling of oil pressure supplied to a friction element when ranges are changed has elapsed. Thus, no detection delay time is provided, and the process proceeds directly to the step 208.

In the step 208, it is checked again whether or not the same oil pressure switch is ON.

If the oil pressure switch is ON, the process proceeds to a step 209 wherein the timer value TC which has been counted in the first stage and kept in the vicinity of the predetermined value Tc is reset.

Next, in a step 210, the timer value TB is incremented, and in a step 211, it is checked whether or not the timer value TB has become equal to or greater than the predetermined value Tb. The steps 208 to 211 are repeated until the timer value TB has become equal to or greater than the predetermined value Tb.

When the timer value TB has become equal to or greater than the predetermined value Tb, the process proceeds to a step 212 wherein the abnormal flag FLAG is set to "1" (FLAG=1), followed by termination of the process.

On the other hand, if as a result of checking in the step 200, the abnormal flag assumes "1" (FLAG=1), the process proceeds to a step 220 wherein it is checked whether or not the oil pressure switch is OFF.

If the oil pressure switch is OFF, the process proceeds to a step 221 wherein the timer values TA and TB are reset to 0 if they have any count values.

Next, in a step 222, the timer value TC is incremented, and in a step 223, it is checked whether or not the timer value TC has become equal to or greater than the predetermined value Tc. The steps 220 to 223 are repeated until the timer value TC has become equal to or greater than the predetermined value Tc.

When the timer value TC has become equal to or greater than the predetermined value Tc, the process proceeds to a step 224 wherein the abnormal flag FLAG is reset (FLAG=0), followed by termination of the process.

If, as a result of checking in the step 203, it is determined that the oil pressure switch is not ON, and if, as a result of checking in the step 208, the oil pressure switch is not ON, the process proceeds respectively to the step 221 to check the duration of time that the oil pressure switch has been OFF. When the timer TC becomes equal to or greater than the predetermined value Tc, the abnormal flag FLAG is also reset in the step 224.

Also, if, as a result of checking in the step 220, the oil pressure switch is not OFF, the process proceeds to the step 201. Consequently, if the oil pressure switch is turned OFF in the step 201 or any of the subsequent steps, the process branches to the step 221, and the abnormal flag FLAG is reset in the step 224. On the other hand, if the oil pressure switch is kept ON in the step 201 and the subsequent steps, the abnormal flag FLAG is kept at "1" in the step 212.

Figure 8:
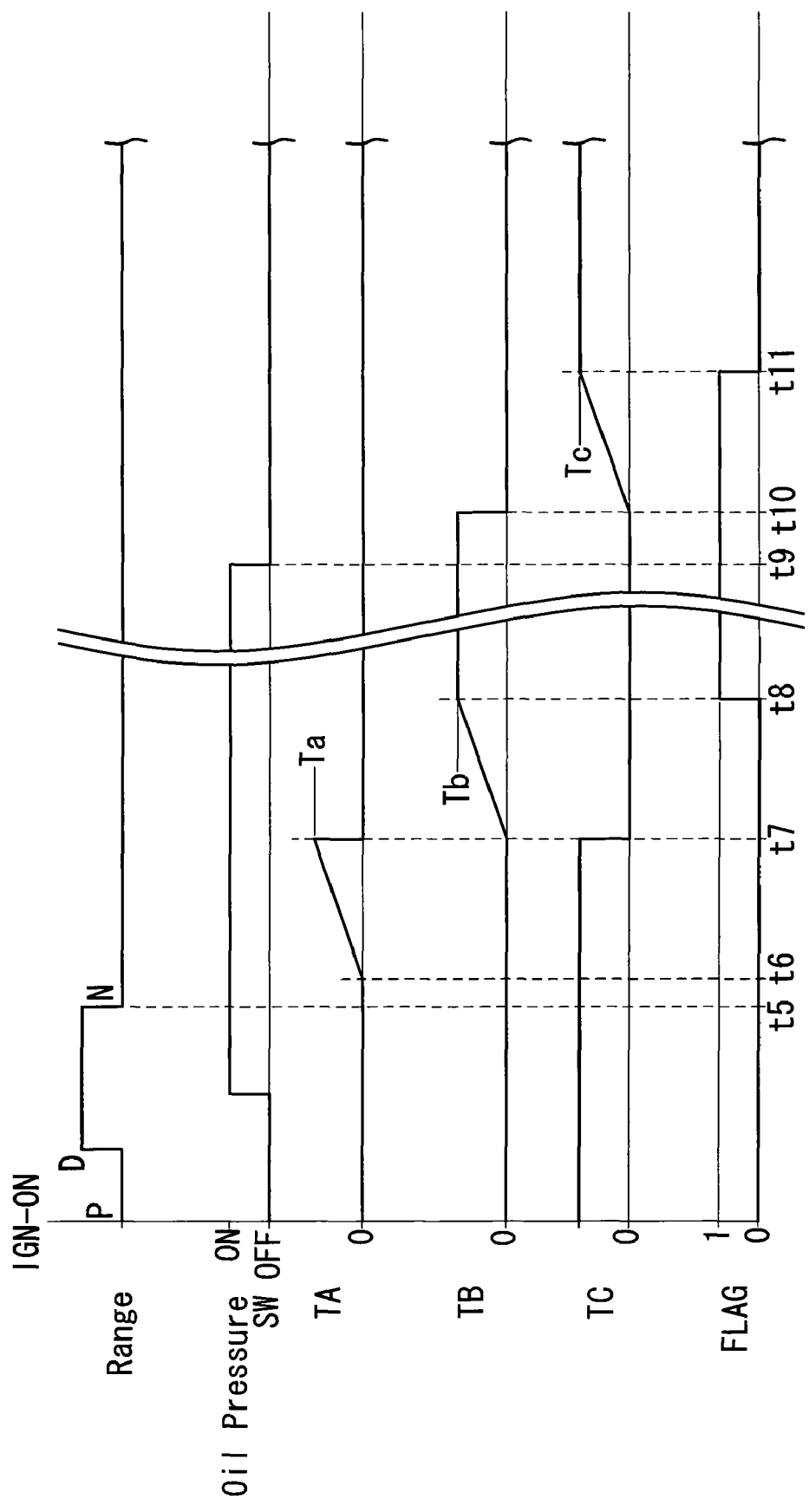
FIG. 8 is a flow chart showing changes in control parameters in the second stage.

FIG. 8 is a time chart of the above described flow in the second stage of the oil pressure switch state determining process.

First, a description will be given of the flow in the steps 200 and 201 to 212 in the case where the oil pressure switch has failed. It is assumed here that the oil pressure switch is kept ON due to a failure in driving in the forward D range.

If the oil pressure switch is ON at a time t6 immediately after a time t5 at which the range is switched from the D range to the N range with the abnormal flag FLAG assuming "0", the lapse of a detection delay time is awaited until a time t7 at which the timer value TA becomes equal to or greater than the predetermined value Ta. After that, if the oil pressure switch is still ON, the timer value TC is reset to 0, and counting of the timer value TB is started. If the oil pressure switch continues to be ON until a time t8 at which the timer value TB becomes equal to or greater than the predetermined value Tb, the abnormal flag FLAG is set to "1" (FLAG=1) at the time t8.

Next, a description will be given of the flow in the steps 200 and 220 to 224 in the case where the oil pressure switch has recovered from the failure.

If the oil pressure switch is turned OFF at a time t9 with the abnormal flag FLAG assuming "1", and the OFF state of the oil pressure switch is detected at a time t10 immediately after the time t9, the timer value TB is reset, and counting of the timer value TC is started. If the oil pressure switch continues to be OFF until a time t11 when the timer value TC becomes equal to or greater than the predetermined value Tc, the abnormal flag FLAG is reset (FLAG=0) at the time t11.

The second stage of the oil pressure state determining process described above is repeatedly carried out at predetermined time intervals while the vehicle is running. In the case where the predetermined time intervals are set to be long, it is preferred that the second stage of the oil pressure state determining process is carried out at least each time the range is switched from the D range to the P, R, or N range.

The A/T control unit 40 determines whether to take measures to avoid interlock based on the state of the abnormal flag FLAG.

Regarding the invention of claims 1 and 2, the steps 101, 102, and 110 in the flow chart of FIG. 4 constitute an oil pressure switch ON state detecting means, and the steps 103 to 105 and 111 to 113 constitute a fail determining means.

Also, regarding the invention of claims 3 to 7, the steps 101, 102, and 110 in the flow chart of FIG. 4 and the steps 203, 204, 208, and 220 in the flow chart of FIG. 7 constitute an oil pressure switch ON state detecting means; the steps 103 to 105 and 111 to 113, a first fail determining means; and the steps 201, 202, 205 to 207, 209 to 212, and 221 to 224, a second fail determining means.

As described above, according to the present embodiment, in the first stage of the oil pressure switch state determining process, the state of an oil pressure switch is checked when the ignition switch is turned on before engine starting at which no oil pressure has not been generated, and if the oil pressure switch is ON, it is determined that the oil pressure switch has failed. As a result, whether or not the oil pressure switch is normal or has failed can be checked with high accuracy and at an early stage irrespective of which range is currently selected in the automatic transmission.

In this case, it is determined that the oil pressure switch has failed when the oil pressure switch has continued to be ON for a predetermined period of time measured by counting of the timer value TB, and as a result, erroneous determination caused by noise can be prevented.

Further, in the second stage of the oil pressure switch state determining process, when the ON state of any of the first to third oil pressure switches which are provided for friction elements engaged in the D range is detected in the P, R, and N ranges in which original pressure of operating pressure to friction elements which are engaged in the D range is interrupted by the manual valve 16, it is determined that the oil pressure switch has failed. Thus, even in the case where the state of an oil pressure switch cannot be determined since the state of the oil pressure switch is switched from the ON state to the OFF state and vice versa in the first stage of the oil pressure switch state determining process, it is possible to determine whether or not the oil pressure switch is normal or has failed if the oil pressure switch is one provided for a friction element which is engaged in the D range. As a result, the states of the maximum number of oil pressure switches can be determined.

Also, since the second stage of the oil pressure switch determining process is carried out at least each time the range is switched from the D range to the P, R, or N range, a failure of an oil pressure switch in driving of the vehicle can be immediately detected.

Further, immediately after the range is switched from the D range to the P, R, or N range, whether or not an oil pressure switch is normal or has failed is determined after the lapse of a predetermined detection delay time measured by counting of the timer value TA, and therefore erroneous determination can be prevented during falling of operating pressure to a friction element engaged in the D range.

Since the length of the detection delay time is set based on the oil temperature, the state of an oil pressure switch can be quickly determined without erroneous determination.

Further, in the second stage of the oil pressure switch determining process as well as the first stage of the oil pressure switch determining process, when an oil pressure switch has continued to be ON for a predetermined period of time, it is determined that the oil pressure switch has failed. As a result, it is possible to prevent erroneous determination caused by noise such as a temporary change from the ON state to the OFF state and vice versa.

Although in the above described embodiment, the present invention is applied to the automatic transmission with the gear trains illustrated in FIG. 1, the present invention may be applied to automatic transmissions with various types of gear trains.

Further, although in the second stage of the oil pressure switch determining process, by detecting the ON or OFF state of oil pressure switches in the P, R, and N ranges in which the original pressure of operating pressure to friction elements engaged in the D range is interrupted by the manual valve 16, it is determined whether or not oil pressure switches for friction elements engaged in the D range are normal or have failed, the present invention is not limited to this, but if it is configured such that the original pressure of operating pressure to friction elements engaged in the D range is interrupted in the P, N, and D ranges by gear trains and a hydraulic circuit in an automatic transmission, whether or not oil pressure switches for friction elements engaged in the R range are normal or have failed can be determined in its interrupted state.

What is claimed is:

1. A fail detecting apparatus provided in a vehicular automatic transmission which realizes a plurality of gear positions by engagement and disengagement of friction elements in combination, for determining a state of an oil pressure switch which detects operating pressure of each friction element, comprising:

oil pressure switch ON detecting means for detecting whether any of the oil pressure switches is ON; and fail determining means for determining a state of the oil pressure switch based on a result of detection by said oil pressure switch ON detecting means, wherein at a time of turning-on of an ignition switch before an engine is started, said fail determining means determines that the oil pressure switch has failed when the oil pressure switch is ON.

2. A fail detecting apparatus for a vehicular automatic transmission according to claim 1, wherein said fail determining means determines that the oil pressure switch has failed when the oil pressure switch has continued to be ON for a predetermined period of time.

3. A fail detecting apparatus provided in a vehicular automatic transmission which realizes a plurality of gear positions by engagement and disengagement of friction elements in combination, for determining a state of an oil pressure switch which detects operating pressure of each friction element, comprising:

oil pressure switch ON detecting means for detecting whether any of the oil pressure switches is ON;

first fail determining means for determining that the oil pressure switch has failed when said oil pressure switch detecting means detects an ON state of the oil pressure switch at a time of turning-on of an ignition switch before an engine is started; and second fail determining means for determining that the oil pressure switch has failed when, in a range in which original pressure of operating pressure on a friction element engaged in a forward range is interrupted, said oil pressure switch detecting means detects an ON state of the oil pressure switch for the friction element engaged in the forward range after the engine is started.

4. A fail detecting apparatus provided in a vehicular automatic transmission according to claim 3, wherein said second fail determining means carries out a determination at least each time the forward range is switched to a range in which original pressure of operating pressure to a friction element engaged in the forward range is interrupted.

5. A fail detecting apparatus provided in a vehicular automatic transmission according to claim 3, wherein immediately after the forward range is switched to a range in which original pressure of operating pressure to a friction element engaged in the forward range is interrupted, said second fail determining means carries out a determination after lapse of a predetermined detection delay time.

6. A fail detecting apparatus provided in a vehicular automatic transmission according to claim 5, wherein a length of the detection delay time is set based on an oil temperature.

7. A fail detecting apparatus provided in a vehicular automatic transmission according to claim 3, wherein said first fail determining means and said second fail determining means determine that the oil pressure switch has failed when the oil pressure switch has continued to be ON for a predetermined period of time.

8. A fail detecting apparatus provided in a vehicular automatic transmission according to claim 4, wherein immediately after the forward range is switched to a range in which original pressure of operating pressure to a friction element engaged in the forward range is interrupted, said second fail determining means carries out a determination after lapse of a predetermined detection delay time.

9. A fail detecting apparatus provided in a vehicular automatic transmission according to claim 4, wherein said first fail determining means and said second fail determining means determine that the oil pressure switch has failed when the oil pressure switch has continued to be ON for a predetermined period of time.

* * * * *